(12) United States Patent
Gali et al.

(10) Patent No.: US 11,875,575 B2
(45) Date of Patent: Jan. 16, 2024

(54) VEHICULAR TRAILERING ASSIST SYSTEM WITH TRAILER COLLISION ANGLE DETECTION

(71) Applicant: Magna Electronics Inc., Auburn Hills, MI (US)

(72) Inventors: Jyothi P. Gali, Rochester Hills, MI (US); Harold E. Joseph, Brampton (CA); Prasanna Ananthakrishnan, Tamilnadu (IN); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 257 days.

(21) Appl. No.: 17/443,256

(22) Filed: Jul. 23, 2021

(65) Prior Publication Data

US 2022/0027644 A1 Jan. 27, 2022

Related U.S. Application Data

(60) Provisional application No. 62/705,966, filed on Jul. 24, 2020.

(51) Int. Cl.
*G06V 20/58* (2022.01)
*B60Q 9/00* (2006.01)
(Continued)

(52) U.S. Cl.
CPC .............. *G06V 20/58* (2022.01); *B60Q 9/008* (2013.01); *G06T 7/60* (2013.01); *G06T 7/80* (2017.01); *G06V 10/44* (2022.01); *G08G 1/16* (2013.01); *B60R 1/00* (2013.01); *B60R 2300/307* (2013.01); *B60R 2300/8093* (2013.01); *G06T 2207/30261* (2013.01); *H04N 7/183* (2013.01)

(58) Field of Classification Search
CPC ........ G06V 20/58; G06V 10/44; B60Q 9/008; G06T 7/60; G06T 7/80; G06T 2207/30261; G06T 7/73; G08G 1/16; G08G 1/166; G08G 1/168; B60R 1/00; B60R 2300/307; B60R 2300/8093; B60R 2300/808; H04N 7/183
See application file for complete search history.

(56) References Cited

U.S. PATENT DOCUMENTS

6,690,268 B2 2/2004 Schofield et al.
7,038,577 B2 5/2006 Pawlicki et al.
(Continued)

*Primary Examiner* — Molly Wilburn
(74) *Attorney, Agent, or Firm* — HONIGMAN LLP (57) ABSTRACT

A vehicular trailer assist system includes a camera disposed at a rear portion of a vehicle and having an exterior field of view that includes at least a portion of a trailer hitched to the vehicle. A control, responsive to processing of frames of image data captured by the camera and during a calibration maneuver by the vehicle, determines a trailer template of trailer hitched to the vehicle. The control, during a turning portion of the calibration maneuver, determines a trailer collision angle based on the determined trailer template. The control, after completion of the calibration maneuver, determines a current trailer angle of the trailer relative to the vehicle as the vehicle is driven along a road. The control alerts an operator of the vehicle if the current trailer angle is within a threshold amount of the determined trailer collision angle.

17 Claims, 9 Drawing Sheets

(51) Int. Cl.
*G06T 7/80* (2017.01)
*G06T 7/60* (2017.01)
*G08G 1/16* (2006.01)
*G06V 10/44* (2022.01)
*B60R 1/00* (2022.01)
*H04N 7/18* (2006.01)

(56) References Cited

U.S. PATENT DOCUMENTS

| | | | |
|---|---|---|---|
| 7,720,580 | B2 | 5/2010 | Higgins-Luthman |
| 7,855,755 | B2 | 12/2010 | Weller et al. |
| 9,085,261 | B2 | 7/2015 | Lu et al. |
| 9,446,713 | B2* | 9/2016 | Lu ................. B60R 1/00 |
| 9,558,409 | B2 | 1/2017 | Pliefke et al. |
| 10,071,687 | B2 | 9/2018 | Ihlenburg et al. |
| 10,086,870 | B2 | 10/2018 | Gieseke et al. |
| 10,099,614 | B2 | 10/2018 | Diessner |
| 10,160,382 | B2 | 12/2018 | Pliefke et al. |
| 10,532,698 | B2 | 1/2020 | Potnis et al. |
| 10,552,976 | B2 | 2/2020 | Diessner et al. |
| 10,586,119 | B2 | 3/2020 | Pliefke et al. |
| 10,638,025 | B2 | 4/2020 | Gali et al. |
| 10,706,291 | B2 | 7/2020 | Diessner et al. |
| 10,733,757 | B2 | 8/2020 | Gupta et al. |
| 10,755,110 | B2 | 8/2020 | Bajpai |
| 11,662,196 | B2* | 5/2023 | Joseph ............... G01B 11/26 382/104 |
| 2004/0215374 | A1* | 10/2004 | Shepard ............ B60T 8/1708 701/1 |
| 2014/0085472 | A1* | 3/2014 | Lu ................. B60R 1/00 348/148 |
| 2014/0160276 | A1 | 6/2014 | Pliefke et al. |
| 2015/0002670 | A1 | 1/2015 | Bajpai |
| 2015/0217693 | A1 | 8/2015 | Pliefke et al. |
| 2017/0008559 | A1* | 1/2017 | Shepard ............ B62D 1/046 |
| 2017/0050672 | A1 | 2/2017 | Gieseke et al. |
| 2017/0073003 | A1* | 3/2017 | Shepard ............ B62D 15/029 |
| 2017/0254873 | A1 | 9/2017 | Koravadi |
| 2018/0001928 | A1* | 1/2018 | Lavoie ............ B62D 15/021 |
| 2018/0208241 | A1* | 7/2018 | Shepard ............ B62D 13/06 |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1* | 9/2018 | Diessner ............ G06T 7/74 |
| 2018/0350108 | A1* | 12/2018 | Wang ............... G06T 7/254 |
| 2019/0009815 | A1* | 1/2019 | Lavoie ............ B62D 13/06 |
| 2019/0016264 | A1 | 1/2019 | Potnis et al. |
| 2019/0039649 | A1 | 2/2019 | Gieseke et al. |
| 2019/0042864 | A1 | 2/2019 | Pliefke et al. |
| 2019/0064831 | A1 | 2/2019 | Gali et al. |
| 2019/0118860 | A1 | 4/2019 | Gali et al. |
| 2019/0143895 | A1 | 5/2019 | Pliefke et al. |
| 2019/0297233 | A1 | 9/2019 | Gali et al. |
| 2019/0347825 | A1 | 11/2019 | Gupta et al. |
| 2020/0017143 | A1 | 1/2020 | Gali |
| 2020/0334475 | A1 | 10/2020 | Joseph et al. |
| 2020/0356788 | A1 | 11/2020 | Joseph et al. |
| 2020/0361397 | A1 | 11/2020 | Joseph et al. |
| 2020/0406967 | A1 | 12/2020 | Yunus et al. |
| 2022/0027644 | A1 | 1/2022 | Gali et al. |
| 2022/0028111 | A1 | 1/2022 | Gali et al. |

\* cited by examiner

VEHICULAR TRAILERING ASSIST SYSTEM WITH TRAILER COLLISION ANGLE DETECTION

CROSS REFERENCE TO RELATED APPLICATION

The present application claims the filing benefits of U.S. provisional application Ser. No. 62/705,966, filed Jul. 24, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a trailer assist system for a vehicle that utilizes a camera (preferably a CMOS cameras) to capture image data representative of images exterior of the vehicle, and provides a control comprising electronic circuitry and associated software. The electronic circuitry includes an image processor operable to process image data captured by the camera. The image data captured by the camera is representative of at least a portion of the trailer hitched to the vehicle via a pivoting joint hitch connection. The control, with the trailer hitched to the vehicle and responsive to processing of image data captured by the camera and during a calibration maneuver by the vehicle, determines a trailer template of a trailer hitched to the vehicle. The control, during a turning portion of the calibration maneuver, and at least in part via processing of frames of image data captured by the camera during the turning portion of the calibration maneuver, determines a trailer collision angle based on the determined trailer template. The ECU, after completion of the calibration maneuver, and via processing of frames of image data captured by the camera as the vehicle is driven along a road, determines a current trailer angle of the trailer relative to a longitudinal axis of the vehicle as the vehicle is driven along the road. The ECU, responsive to determining the current trailer angle, determines whether the current trailer angle is within a threshold amount of the determined trailer collision angle. The ECU, responsive to the current trailer angle being with the threshold amount of the determined trailer collision angle, notifies a driver of the vehicle.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward (or forward) direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
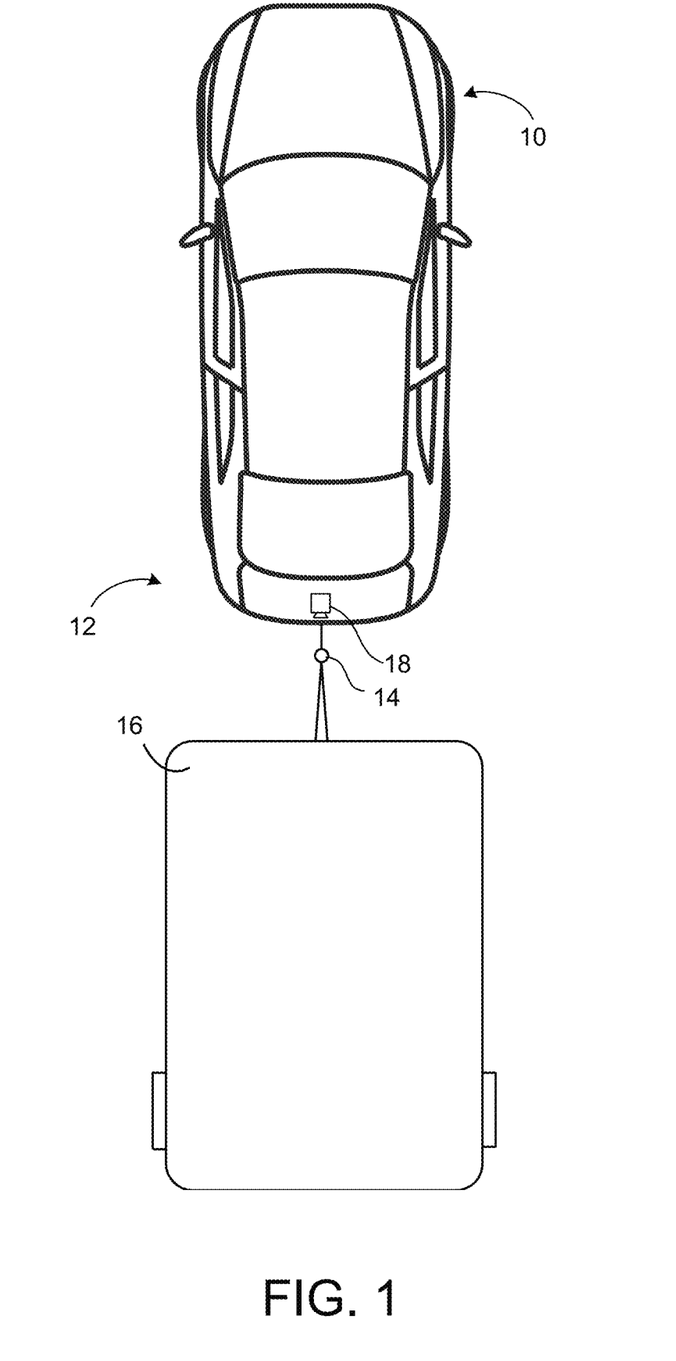
FIG. 1 is a plan view of a vehicle with a trailer assist system that is operable to steer a trailer along a trailer direction.

Referring now to the drawings and the illustrative embodiments depicted therein, a vehicle 10 includes a trailer maneuver assist system 12 that is operable to assist in backing up or reversing the vehicle with a trailer hitched to the vehicle via, for example, a hitch 14, and that may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
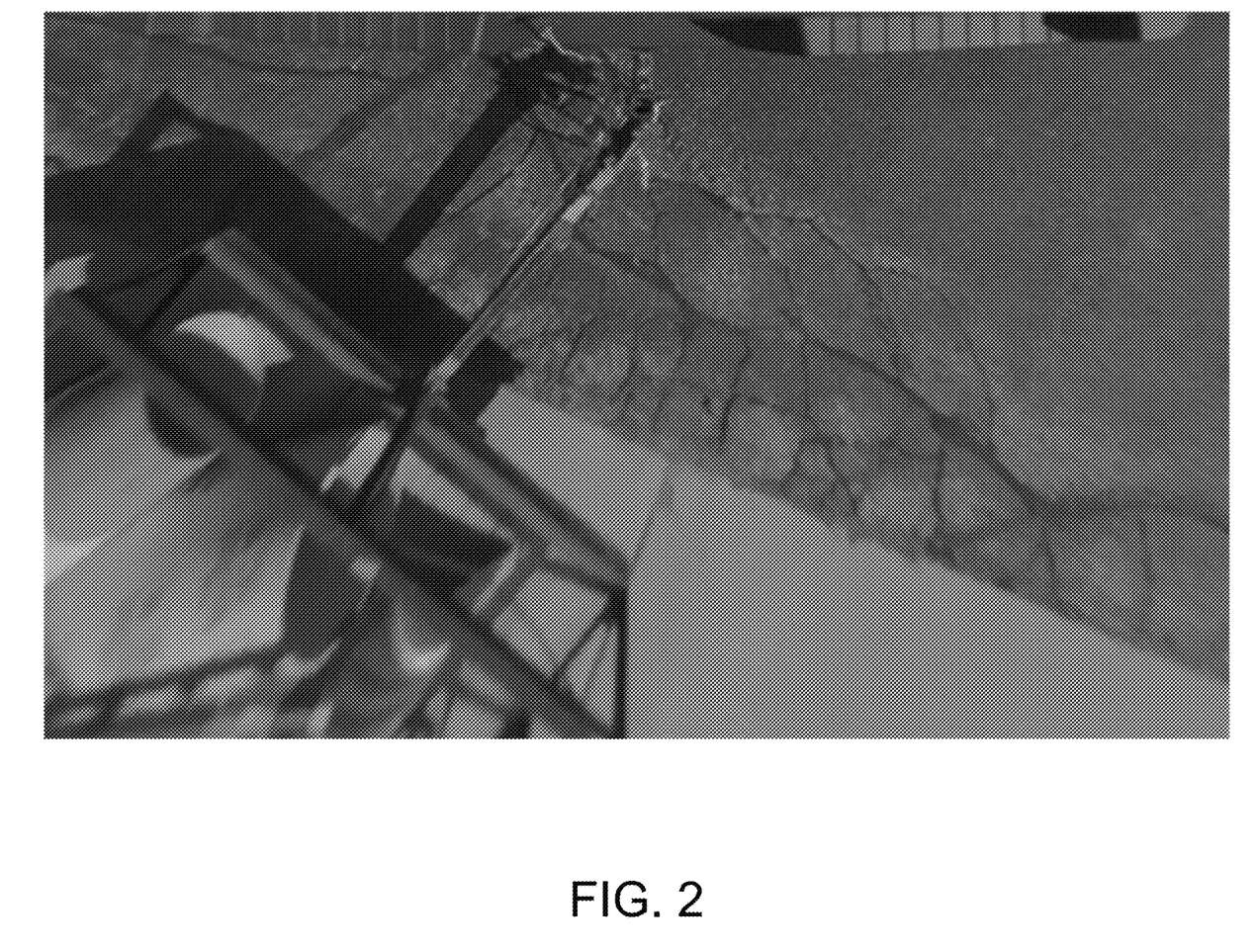
FIG. 2 is an exemplary frame of image data of a trailer hitch captured by a rear-viewing camera disposed at a towing vehicle.

A trailer configured to be towed by a towing vehicle may be modeled as a rigid body with different sizes and shapes connected to the towing vehicle via a hitch ball. Thus, when the towing vehicle moves (e.g., turns or drives forward or reverses), the trailer towed by the vehicle correspondingly moves. Because the trailer is generally a rigid body on wheels connected via a pivot point (i.e., the hitch point) with the towing vehicle, the trailer body may collide with the towing vehicle and cause accidents. A trailer collision angle is typically defined as the angle between a towing vehicle and trailer where the trailer will collide with the towing vehicle (such as when the vehicle is reversing and turning and the trailer jack-knifes toward one side or the other and/or when the vehicle is traveling forward and making and maintaining a sharp turn toward one side or the other). It is important to determine an accurate estimation of the trailer collision angle in order to prevent and/or warn an operator of such potential incidents. As shown in FIG. 2, a top down image captured by a rear-view camera (e.g., a camera mounted at the rear of the towing vehicle, such as the vehicle's rear backup camera) may be used to detect the trailer collision angle.

A trailer angle detection system described herein detects or determines the trailer collision angle and accurately estimates the contours of the connected trailer and the point and angle at which the trailer may collide with the towing vehicle. The system may determine the trailer collision angle despite non-symmetrical vehicle and/or trailer bodies, other objects in the vicinity of the trailer/towing vehicle (e.g., objects of various heights), and/or shadows on the ground or on other objects. The trailer assist system may utilize aspects described in U.S. provisional applications, Ser. No. 62/705,967, filed Jul. 24, 2020 and titled VEHICULAR TRAILERING ASSIST SYSTEM WITH HITCH BALL DETECTION, and/or Ser. No. 62/705,968, filed Jul. 24, 2020 and titled VEHICULAR TRAILERING ASSIST SYSTEM WITH TRAILER CALIBRATION FEATURE, which are hereby incorporated herein by reference in their entireties.

Figure 3A:
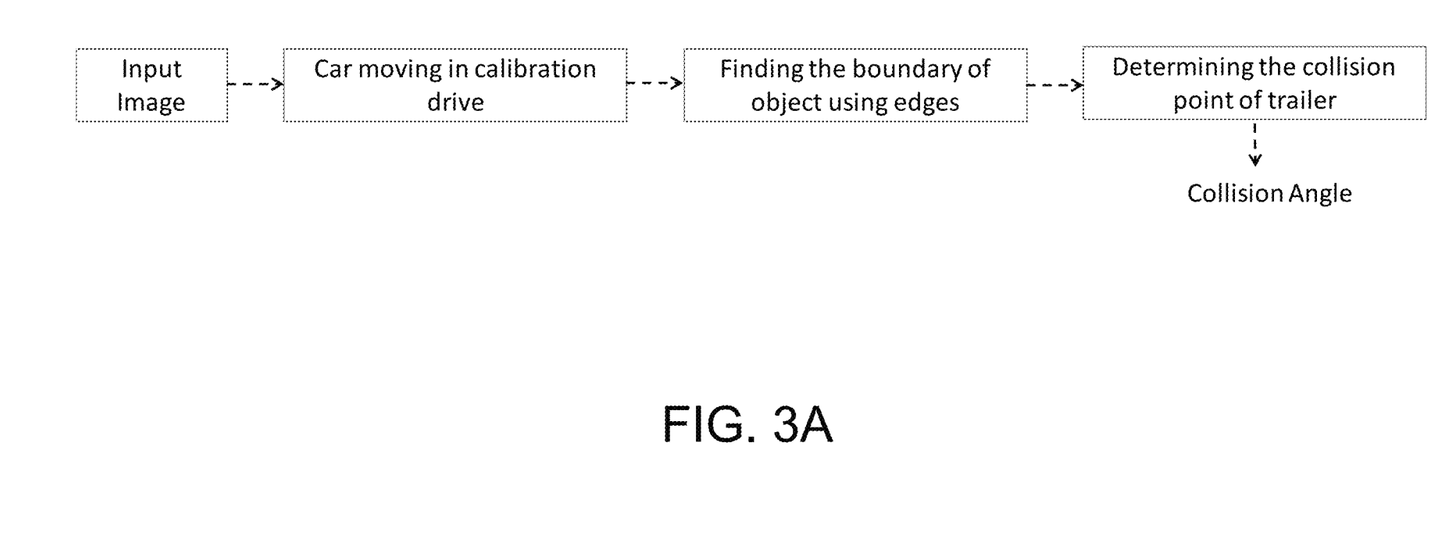
FIGS. 3A and 3B are schematic views of block diagrams of the trailer assist system of FIG. 1.

Referring now to FIG. 3A, the trailer angle detection system receives a frame of image data (e.g., from a rear-viewing camera disposed at the towing vehicle) while the towing vehicle tows the trailer through a calibration drive. During the calibration drive, the system determines boundaries of the trailer using edges and determines the collision point of the trailer based on the determined edges. From the collision point, the system determines the collision angle.

Figure 3B:
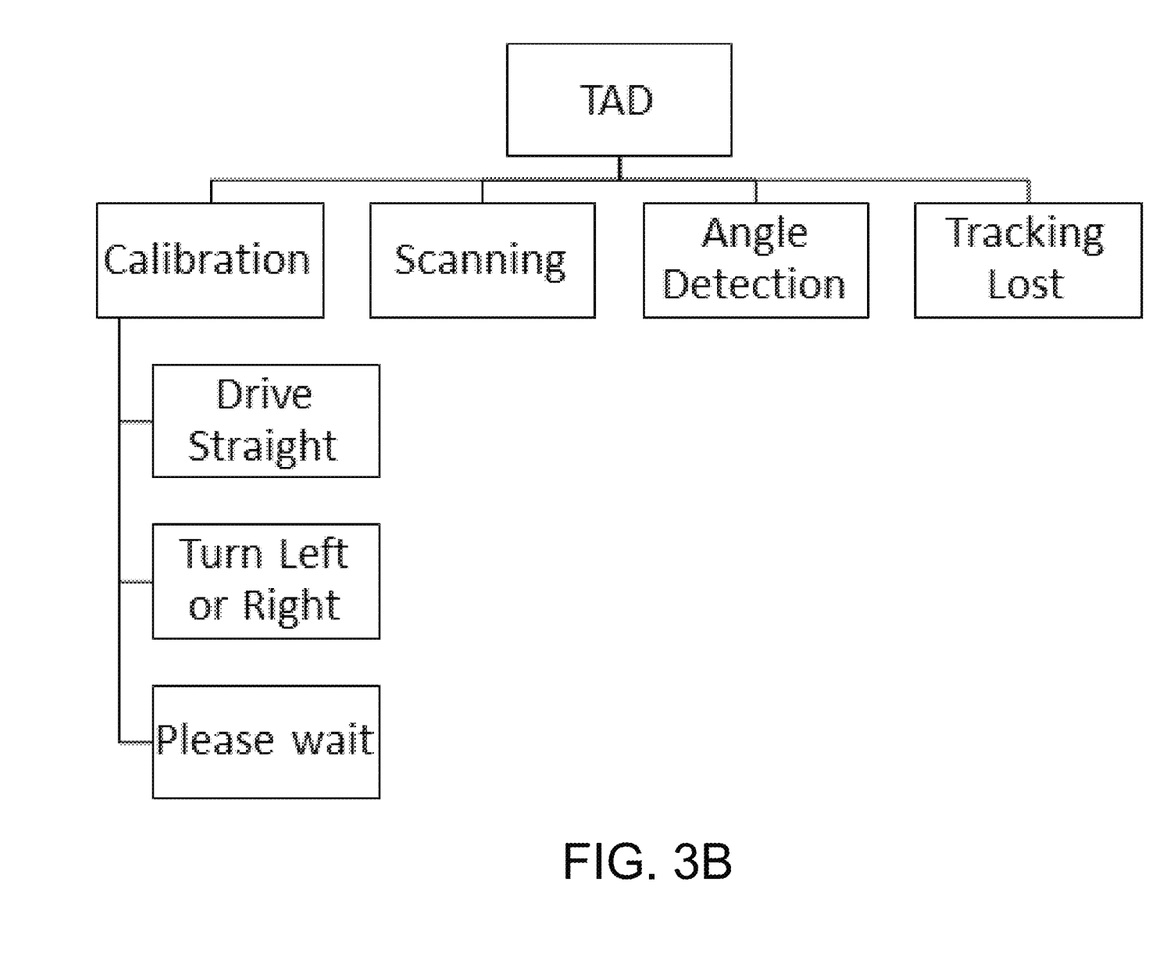

Referring now to FIG. 3B, and as described in more detail below, the trailer angle detection system includes four states: a calibration state, a scanning state, an angle detection state, and a tracking lost state. Hitch ball detection is performed during the calibration state. The calibration state also includes three sub-states: a drive straight state, a turn left or right state, and a please wait state. The system determines the trailer collision angle (i.e., the angle where the trailer is in danger of colliding with the towing vehicle) by determining a boundary of the trailer. The system determines the boundary of the trailer after angle sampling and hitch ball detection is complete.

Figure 4:
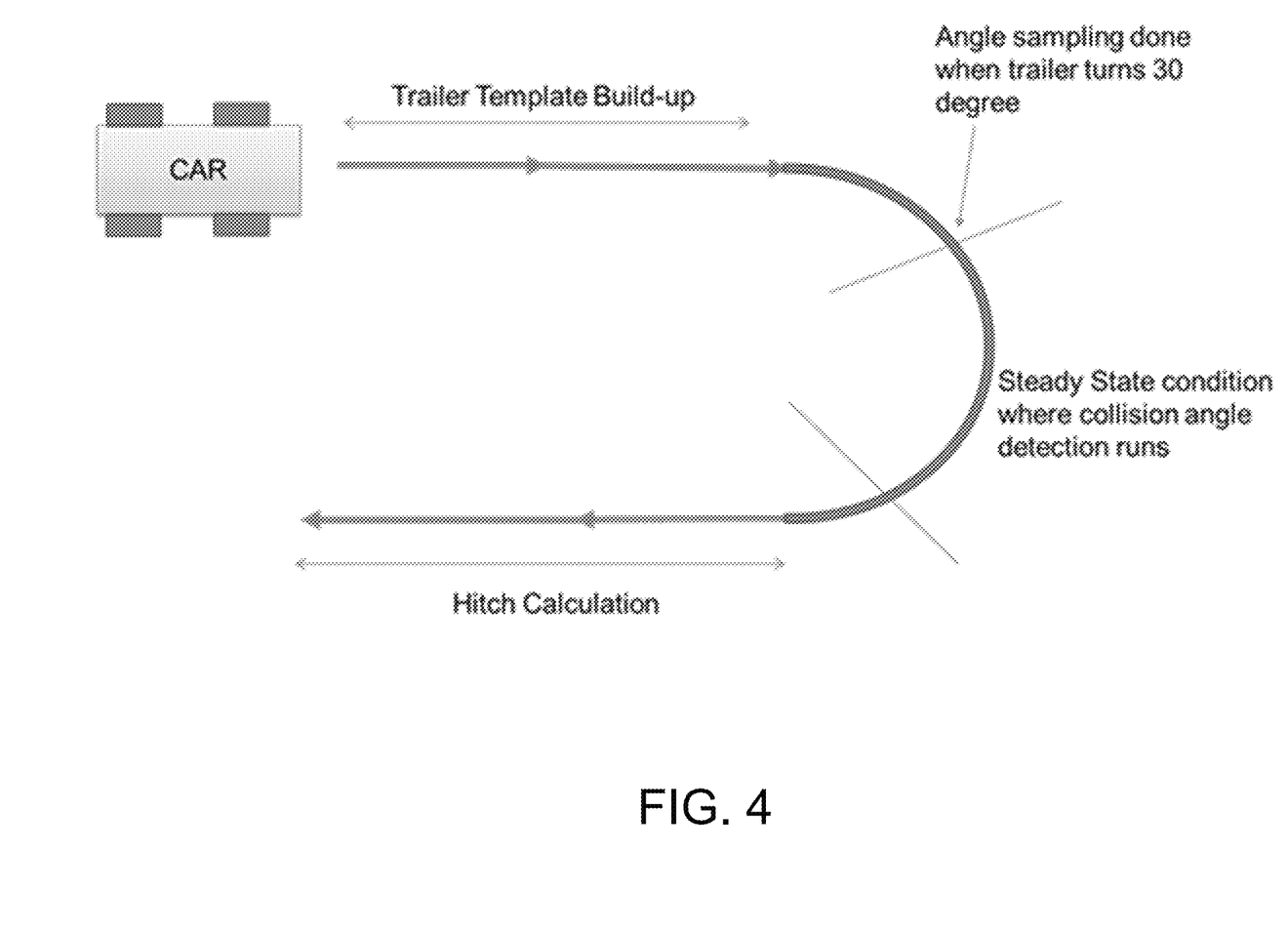
FIG. 4 is a schematic view of a vehicle performing a calibration maneuver.
Figure 5:
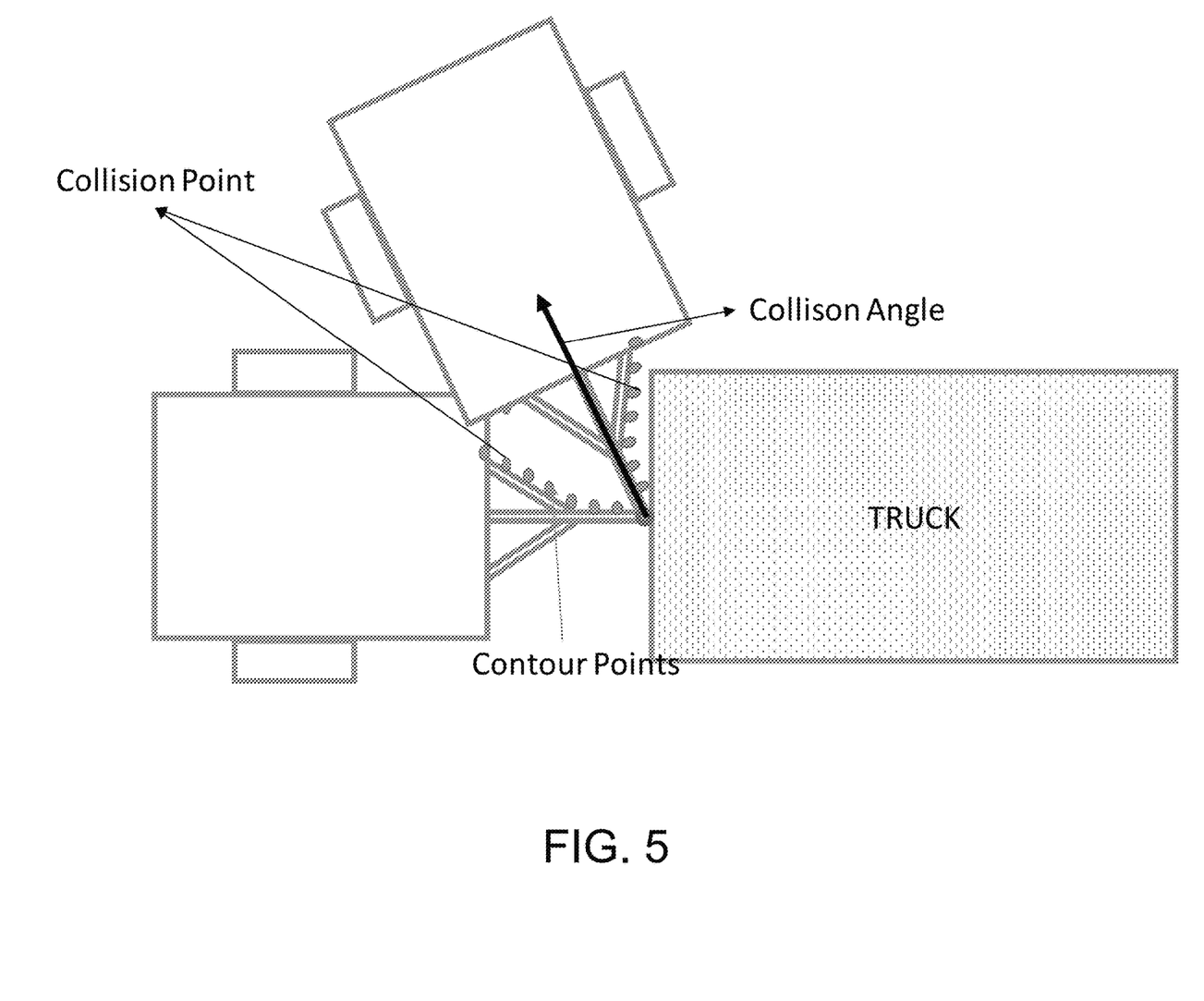
FIG. 5 is a schematic view of a vehicle colliding with a trailer being towed by the vehicle at a trailer collision angle.

Referring now to FIGS. 4 and 5, during the calibration drive state, the vehicle may perform a calibration drive by first driving straight in a forward direction and then performing a U-turn and again driving straight in the forward direction. Optionally, the calibration state calibrates a new trailer which has not previously been hitched to the towing vehicle or previously calibrated by the towing vehicle (i.e., a trailer template has not previously been determined for the trailer). The system may determine (e.g., via processing of camera image data) that the trailer is new/uncalibrated or alternatively an operator of the vehicle may indicate that the trailer is new (e.g., by selecting an option via a vehicle display or touch screen or other user-actuatable input to begin trailer calibration). While in the calibration state (i.e., during calibration), the system determines a trailer template, the hitch ball point, and the collision angle. From the calibration state, the system automatically enters the first sub-state (i.e., the drive straight state).

During the drive straight state, the operator (or the vehicle, when the vehicle is operating autonomously or semi-autonomously) drives the vehicle in a straight line (i.e., with a steering angle of zero or approximately zero) in a forward direction. The drive straight state may also require the vehicle to maintain a speed above a threshold speed for a certain distance (e.g., above 5 mph for 20 meters). During the drive straight state, the system creates the trailer template which the system will subsequently use to perform hitch range detection and hitch ball detection.

After the drive straight state, the system proceeds to the turn left or right state. During this state the operator or vehicle performs a U-turn (i.e., turns the vehicle 180 degrees, such as shown in FIG. 4) to either the left or the right of the vehicle with a steady wheel angle. After completing the U-turn, the operator or vehicle again maintains a wheel angle at or approximately zero to drive the vehicle in a straight line. During the U-turn, the system collects data to perform the hitch range determination and hitch ball detection. For example, the system may perform angle sampling and hitch range determination until a threshold portion of the turn is completed (e.g., 30 degrees of the 180 degrees). The system may determine the collision angle after performing angle sampling during a steady state condition of the turn. Optionally, the system only determines the collision angle (FIG. 5) after achieving the steady state condition (i.e., the angle between the vehicle and the trailer are not substantially changing).

For example, during a first portion of the turn (e.g., the first 30 degrees), the trailer angle relative to the vehicle may change as the trailer begins to enter the turn along with the towing vehicle. After the first portion of the turn (e.g., after the vehicle has turned 30 degrees), the trailer angle relative to the vehicle may enter a steady state until the vehicle completes the turn (and thus the vehicle begins exiting the turn prior to the trailer exiting the turn). The system may determine the collision angle during the steady state portion of the turn. Put another way, the steady state condition occurs when the wheel angle of a towing vehicle is maintained at a constant angle and the trailer angle relative to the vehicle remains steady. The angle calculated during this state may be considered a steady state angle.

Figure 6A:
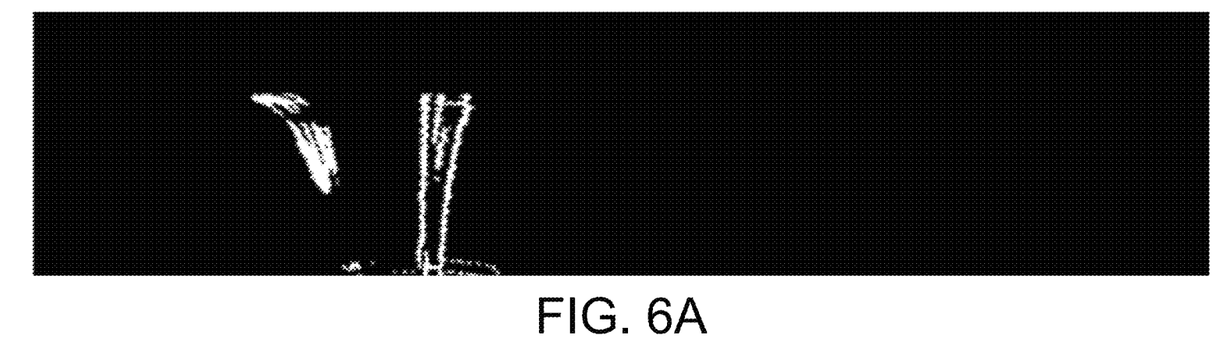
FIGS. 6A and 6B are schematic views of determined edges of a trailer towed by a vehicle.
Figure 6B:
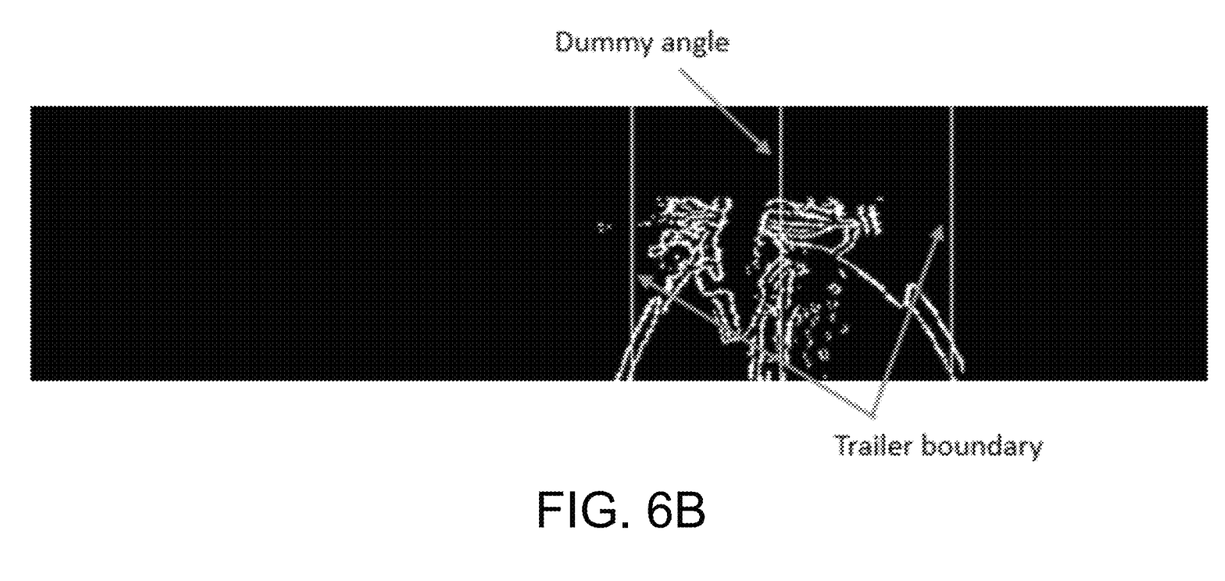

Referring now to FIGS. 6A and 6B, when the trailer angle enters the steady state phase of the turn, the system begins building edges of the trailer using image data captured by the rear-viewing camera. After building edges for a threshold number of image frames (e.g., 30 frames of image data or the final 30 frames of image data or the like), the system determines a final edge of the trailer (FIG. 6A). Once the final edge image is determined, the system performs a boundary detection. Initially, the system generates a horizontal profile and determines a maximum value. A value from the left is greater than 25 percent of the determined maximum value. The system determines that position as the boundary on the left side of the trailer. The same process may be repeated for the right side edge determination of the trailer as well. A region nearest to a dummy angle is selected as collision point of trailer.

Figure 7:
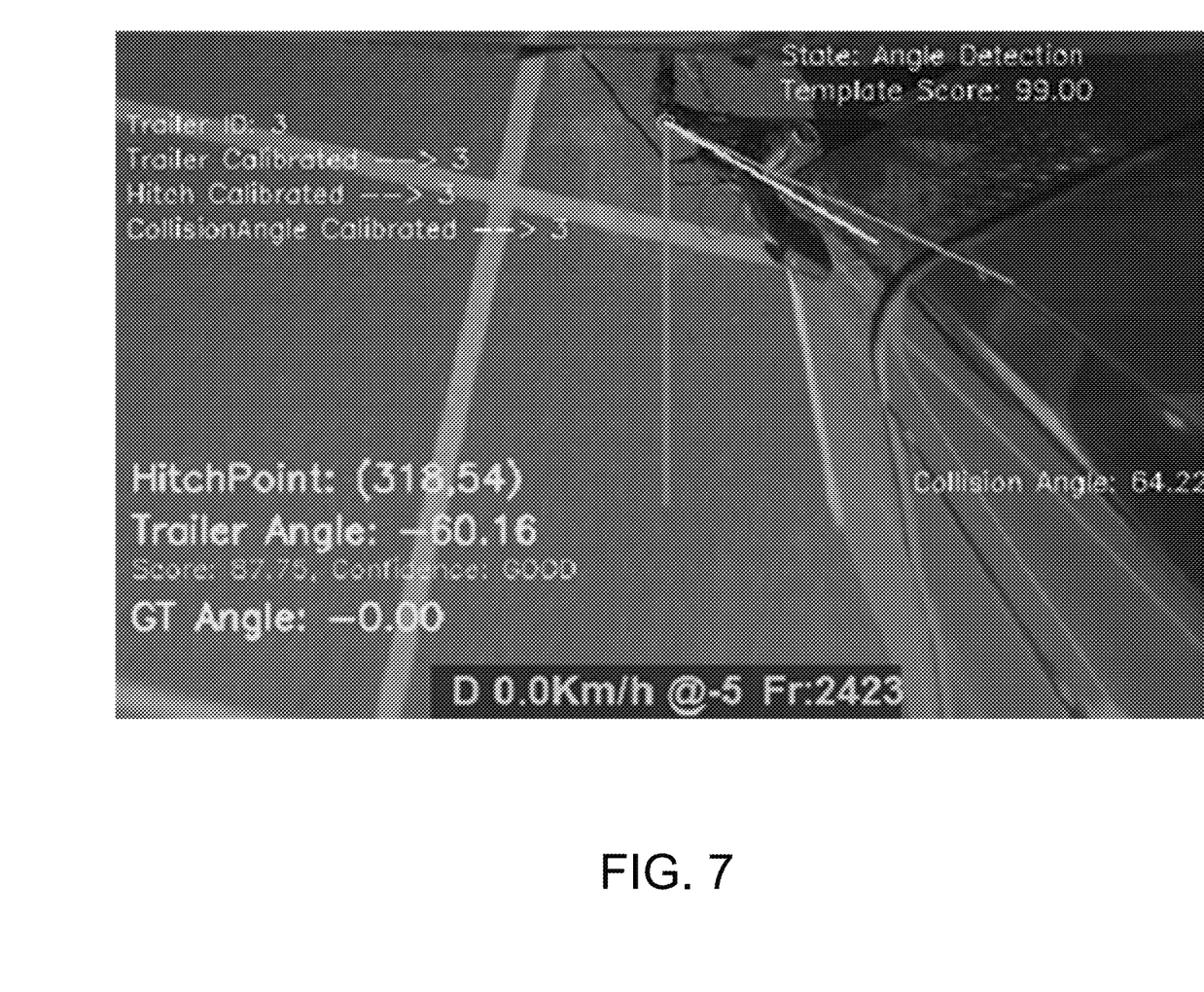
FIG. 7 is an exemplary frame of image data captured by a rear-viewing camera displaying a current trailer angle and a determined trailer collision angle.

After the vehicle completes the turn and drives straight for a threshold distance, the system exits the turn left or right sub-state and enters the please wait sub-state. During this state, the system processes the data collected previously (i.e., during the turn left or right state) to determine the hitch ball position. After the hitch ball position is determined or calculated, the system may enter a scanning state, where the system continuously monitors the current trailer angle and determines when tracking of the current trailer angle is lost. FIG. 7 illustrates an exemplary frame of image data captured by a rear-viewing camera of a towing vehicle with overlays that indicate the hitch point, the trailer angle, and the collision angle determined by the system.

Figure 8A:
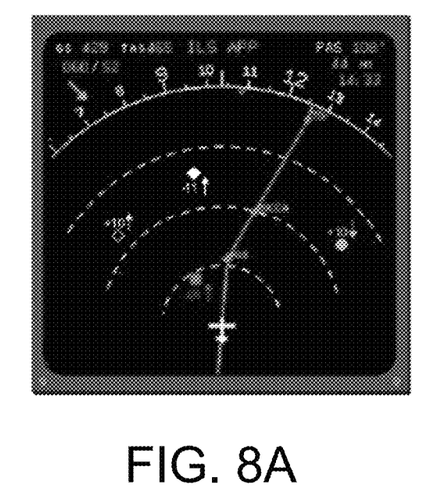
FIGS. 8A and 8B are exemplary images of potential applications of the trailer assist system of FIG. 1.
Figure 8B:
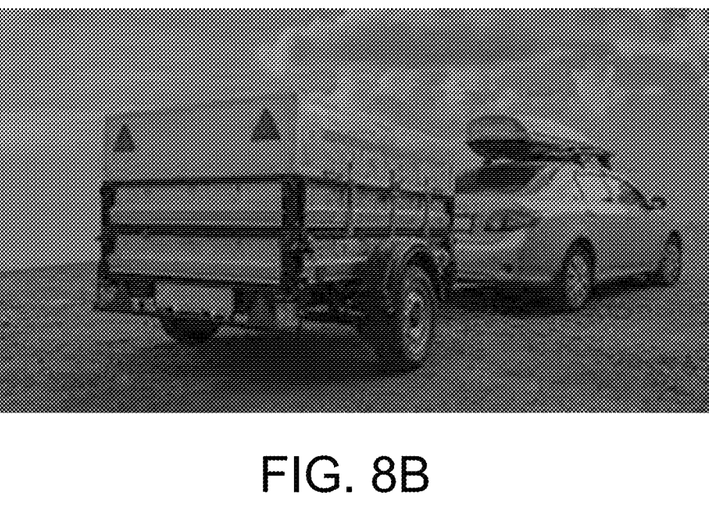

Thus, the trailer angle detection system correctly determines the trailer collision angle based on determined edges of the trailers even with non-symmetric trailer shapes via calibration without the need of reversing. That is, the system determines the trailer collision angle via a calibration maneuver in the forward direction, and the trailering assist system or other trailering assist systems may use the determined trailer collision angle to determine potential collisions between the trailer and the vehicle during maneuvers by the towing vehicle and the trailer both in the forward direction and in a reversing direction. As shown in FIGS. 8A and 8B, the system may also be applicable to other problems, such as determining the angle of a seesaw hitting the ground, guiding aircraft during navigation, and any other applications that require towing an object around a pivot point.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,532,698; 10,552,976; 10,160,382; 10,086,870; 9,558,409; 9,446,713; 9,085,261 and/or 6,690,268, and/or U.S. Publication Nos. US-2020-0406967; US-2020-0356788; US-2020-0334475; US-2020-0361397; US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system for a vehicle, the vehicular trailering assist system comprising:
    a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;
    wherein the camera captures frames of image data that include image data representative of at least a portion of the trailer hitched to the vehicle;
    an electronic control unit (ECU) comprising electronic circuitry and associated software;
    wherein the electronic circuitry comprises an image processor operable to process frames of image data captured by the camera;
    wherein, with the trailer hitched to the vehicle, the ECU, responsive to processing of frames of image data captured by the camera during a calibration maneuver by the vehicle, determines a trailer template of the trailer hitched to the vehicle;
    wherein the ECU, during a turning portion of the calibration maneuver, and at least in part via processing of frames of image data captured by the camera during the turning portion of the calibration maneuver, determines a trailer collision angle based on the determined trailer template;
    wherein the ECU determines one or more edges of the trailer, and wherein the ECU determines the trailer collision angle based on one or more determined edges of the trailer;
    wherein the ECU, after completion of the calibration maneuver, and via processing of frames of image data captured by the camera as the vehicle is driven along a road, determines a current trailer angle of the trailer relative to a longitudinal axis of the vehicle as the vehicle is driven along the road;
    wherein the ECU, responsive to determining the current trailer angle, determines whether the current trailer angle is within a threshold amount of the determined trailer collision angle; and
    wherein the ECU, responsive to the current trailer angle being with the threshold amount of the determined trailer collision angle, notifies a driver of the vehicle.

2. The vehicular trailering assist system of claim 1, wherein the calibration maneuver is initiated by the driver of the vehicle when the trailer template for the trailer hitched to the vehicle has not previously been determined by the vehicular trailering assist system.

3. The vehicular trailering assist system of claim 1, wherein the calibration maneuver comprises a first portion where the vehicle drives in a straight line, a second portion where the vehicle turns 180 degrees and a third portion where the vehicle drives straight.

4. The vehicular trailering assist system of claim 3, wherein the ECU determines the trailer template during the first portion of the calibration maneuver.

5. The vehicular trailering assist system of claim 4, wherein the ECU determines the trailer collision angle during the second portion of the calibration maneuver.

6. The vehicular trailering assist system of claim 1, wherein the ECU determines the one or more edges of the trailer based on a portion of frames of image data captured by the camera during a portion of the calibration maneuver.

7. The vehicular trailering assist system of claim 6, wherein the portion of the calibration maneuver comprises a turn and wherein the portion of frames of image data captured by the camera comprise a final portion of frames of image data captured by the camera during the turn.

8. The vehicular trailering assist system of claim 7, wherein the ECU determines a horizontal profile using the one or more determined edges of the trailer.

9. A vehicular trailering assist system for a vehicle, the vehicular trailering assist system comprising:
    a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;
    wherein the camera captures frames of image data that include image data representative of at least a portion of the trailer hitched to the vehicle;
    an electronic control unit (ECU) comprising electronic circuitry and associated software;
    wherein the electronic circuitry comprises an image processor operable to process frames of image data captured by the camera;
    wherein, with the trailer hitched to the vehicle, the ECU, responsive to processing of frames of image data captured by the camera during a calibration maneuver by the vehicle, determines a trailer template of the trailer hitched to the vehicle;
    wherein the ECU, during a turning portion of the calibration maneuver, and at least in part via processing of frames of image data captured by the camera during the turning portion of the calibration maneuver, determines a trailer collision angle based on the determined trailer template;
    wherein the ECU, after completion of the calibration maneuver, and via processing of frames of image data captured by the camera as the vehicle is driven along a road, determines a current trailer angle of the trailer relative to a longitudinal axis of the vehicle as the vehicle is driven along the road;

wherein the ECU, responsive to determining the current trailer angle, determines whether the current trailer angle is within a threshold amount of the determined trailer collision angle;

wherein the ECU, responsive to the current trailer angle being with the threshold amount of the determined trailer collision angle, notifies a driver of the vehicle;

wherein the calibration maneuver comprises a first portion where the vehicle drives in a straight line, a second portion where the vehicle turns 180 degrees and a third portion where the vehicle drives straight;

wherein the ECU determines the trailer template during the first portion of the calibration maneuver;

wherein the ECU determines the trailer collision angle during the second portion of the calibration maneuver; and wherein the ECU determines the trailer collision angle after a trailer angle of the trailer relative to the vehicle enters a steady state during the second portion of the calibration maneuver.

10. A vehicular trailering assist system for a vehicle, the vehicular trailering assist system comprising:

a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;

wherein the camera captures frames of image data that include image data representative of at least a portion of the trailer hitched to the vehicle;

an electronic control unit (ECU) comprising electronic circuitry and associated software;

wherein the electronic circuitry comprises an image processor operable to process frames of image data captured by the camera;

wherein, with the trailer hitched to the vehicle, the ECU determines whether a trailer template for the trailer hitched to the vehicle has not previously been determined by the vehicular trailering assist system;

wherein, with the trailer hitched to the vehicle, the ECU, responsive to determining that the trailer template for the trailer hitched to the vehicle has not previously been determined by the vehicular trailering assist system, and responsive to processing of frames of image data captured by the camera during a calibration maneuver by the vehicle, determines the trailer template for the trailer hitched to the vehicle;

wherein the ECU, during a turning portion of the calibration maneuver, and at least in part via processing of frames of image data captured by the camera during the turning portion of the calibration maneuver, determines a trailer collision angle based on the determined trailer template;

wherein the ECU determines one or more edges of the trailer, and wherein the ECU determines the trailer collision angle based on one or more determined edges of the trailer;

wherein the ECU, after completion of the calibration maneuver, and via processing of frames of image data captured by the camera as the vehicle is driven along a road, determines a current trailer angle of the trailer relative to a longitudinal axis of the vehicle as the vehicle is driven along the road;

wherein the ECU, responsive to determining the current trailer angle, determines whether the current trailer angle is within a threshold amount of the determined trailer collision angle; and wherein the ECU, responsive to the current trailer angle being with the threshold amount of the determined trailer collision angle, notifies a driver of the vehicle.

11. The vehicular trailering assist system of claim 10, wherein the calibration maneuver comprises a first portion where the vehicle drives in a straight line, a second portion where the vehicle turns 180 degrees and a third portion where the vehicle drives straight.

12. The vehicular trailering assist system of claim 11, wherein the ECU determines the trailer template during the first portion of the calibration maneuver.

13. The vehicular trailering assist system of claim 12, wherein the ECU determines the trailer collision angle during the second portion of the calibration maneuver.

14. The vehicular trailering assist system of claim 13, wherein the ECU determines the trailer collision angle after a trailer angle of the trailer relative to the vehicle enters a steady state during the second portion of the calibration maneuver.

15. A vehicular trailering assist system for a vehicle, the vehicular trailering assist system comprising:

a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;

wherein the camera captures frames of image data that include image data representative of at least a portion of the trailer hitched to the vehicle;

an electronic control unit (ECU) comprising electronic circuitry and associated software;

wherein the electronic circuitry comprises an image processor operable to process frames of image data captured by the camera;

wherein, with the trailer hitched to the vehicle, the vehicle performs a calibration maneuver comprising a first portion where the vehicle drives in a straight line, a second portion where the vehicle turns 180 degrees and a third portion where the vehicle drives straight;

wherein the ECU, during the first portion of the calibration maneuver by the vehicle, determines a trailer template of the trailer hitched to the vehicle;

wherein the ECU, during the second portion of the calibration maneuver, and at least in part via processing of frames of image data captured by the camera during the second portion of the calibration maneuver, determines a trailer collision angle based on the determined trailer template;

wherein the ECU determines one or more edges of the trailer, and wherein the ECU determines the trailer collision angle based on one or more determined edges of the trailer;

wherein the ECU, after completion of the calibration maneuver, and via processing of frames of image data captured by the camera as the vehicle is driven along a road, determines a current trailer angle of the trailer relative to a longitudinal axis of the vehicle as the vehicle is driven along the road;

wherein the ECU, responsive to determining the current trailer angle, determines whether the current trailer angle is within a threshold amount of the determined trailer collision angle; and wherein the ECU, responsive to the current trailer angle being with the threshold amount of the determined trailer collision angle, notifies a driver of the vehicle.

16. The vehicular trailering assist system of claim 15, wherein the ECU determines the one or more edges of the trailer based on a portion of frames of image data captured by the camera during a portion of the calibration maneuver.

17. The vehicular trailering assist system of claim 16, wherein the portion of the calibration maneuver comprises a turn and wherein the portion of frames of image data captured by the camera comprise a final portion of frames of image data captured by the camera during the turn.

* * * * *

UNITED STATES PATENT AND TRADEMARK OFFICE
CERTIFICATE OF CORRECTION

PATENT NO. : 11,875,575 B2
APPLICATION NO. : 17/443256
DATED : January 16, 2024
INVENTOR(S) : Jyothi P. Gali et al.

It is certified that error appears in the above-identified patent and that said Letters Patent is hereby corrected as shown below:

In the Claims

Column 9
Claim 10, Line 61, "trailer:" should be --trailer;--

Signed and Sealed this
Thirteenth Day of February, 2024

Katherine Kelly Vidal
*Director of the United States Patent and Trademark Office*